(12) United States Patent
Belghoul

(10) Patent No.: US 9,515,982 B2
(45) Date of Patent: Dec. 6, 2016

(54) METHOD AND APPARATUS FOR VOICE OVER LTE AND DATA HANDLING IN A ROAMING ENVIRONMENT

(71) Applicant: Broadcom Corporation, Irvine, CA (US)

(72) Inventor: Farouk Belghoul, Campbell, CA (US)

(73) Assignee: Broadcom Corporation, Irvine, CA (US)

( * ) Notice: Subject to any disclaimer, the term of this patent is extended or adjusted under 35 U.S.C. 154(b) by 284 days.

(21) Appl. No.: 13/914,497

(22) Filed: Jun. 10, 2013

(65) Prior Publication Data

US 2014/0362778 A1 Dec. 11, 2014

(51) Int. Cl.
| | |
|---|---|
| *H04L 29/12* | (2006.01) |
| *H04W 76/04* | (2009.01) |
| *H04M 15/00* | (2006.01) |
| *H04W 4/24* | (2009.01) |

(52) U.S. Cl.
CPC .......... *H04L 61/2007* (2013.01); *H04M 15/56* (2013.01); *H04M 15/63* (2013.01); *H04M 15/64* (2013.01); *H04M 15/8038* (2013.01); *H04W 76/046* (2013.01); *H04L 61/2015* (2013.01); *H04W 4/24* (2013.01)

(58) Field of Classification Search
CPC ........................... H04W 8/02; H04L 61/2007
USPC .................................................. 370/329, 331
See application file for complete search history.

(56) References Cited

U.S. PATENT DOCUMENTS

| | | | | |
|---|---|---|---|---|
| 6,826,174 | B1 * | 11/2004 | Erekson et al. | 370/352 |
| 2008/0039087 | A1 * | 2/2008 | Gallagher | H04W 8/04 455/435.2 |
| 2008/0304434 | A1 * | 12/2008 | Giaretta et al. | 370/313 |
| 2009/0046767 | A1 * | 2/2009 | Tinnakornsrisuphap et al. | 375/211 |
| 2009/0168676 | A1 * | 7/2009 | Olson | 370/311 |
| 2011/0319073 | A1 * | 12/2011 | Ekici et al. | 455/426.1 |
| 2012/0134323 | A1 * | 5/2012 | Perkuhn et al. | 370/328 |
| 2012/0320827 | A1 * | 12/2012 | Zhao | H04W 76/04 370/328 |
| 2013/0208729 | A1 * | 8/2013 | Evans | H04L 12/66 370/401 |

* cited by examiner

*Primary Examiner* — Mohammad Anwar
(74) *Attorney, Agent, or Firm* — Sterne, Kessler, Goldstein & Fox P.L.L.C.

(57) ABSTRACT

An approach for reducing online charging for voice over LTE users when accessing a roaming network. Users can receive and make voice over LTE calls without allowing background applications to use the resulting bearer for data traffic such as firmware updates, social network applications and other periodic and aperiodic data traffic. This approach has a beneficial impact on charging costs when accessing roaming networks.

24 Claims, 4 Drawing Sheets

METHOD AND APPARATUS FOR VOICE OVER LTE AND DATA HANDLING IN A ROAMING ENVIRONMENT

BACKGROUND

Field

The disclosure relates generally to wireless communications, and specifically to mechanisms associated with a wireless communications device in a roaming environment.

Background Art

Modern telecommunications networks and devices offer a wide variety of protocols that have evolved over the past decades. Beginning in 1981 with analog wireless (also known as first generation, or "1G"), new generations of wireless service have emerged that provide the market place with every increasing digital throughputs. In 1992, digital wireless service (second generation or "2G") emerged, followed by third generation (3G) service in 2001, which provided multimedia and data support. The year 2011 saw the emergence of fourth generation (4G) wireless services, which are all-IP (internet protocol) networks.

Early protocols such as 1G and 2G protocols were focused exclusively on voice calls. However, data has become increasingly important in wireless communications beginning with various incremental enhancements to the 2G protocols. The pivotal importance of data in the modern day marketplace is best appreciated by the fact that 4G protocols are packet-based networks, with no provision for circuit-switched services such as voice calls.

Despite the wide bandwidth associated with 4G protocols, laptop applications have the potential to require the communication of substantial amounts of data. The rapid rise in popularity of smart phones, and their associated applications, has further exacerbated the demands for the communication of large quantities of data. While wireless service providers have welcomed the demand for their services, they have recognized the importance to adopt appropriate charging profiles so that larger consumers of data are properly charged for the provision of these services. Different charging profiles have surfaced such as an overall limit per month, with additional charges for excesses over that limit being commonplace.

Charging for data usage also occurs when roaming users consume data. Roaming users are users who have travelled outside of their home cellular coverage area. In these situations, wireless service providers have reciprocal agreements to service consumers of other wireless service providers. However, those agreement often result in steep charges for roaming users who consumer data and make voice calls outside their home area.

The charging profiles associated with roaming conditions pose a particular problem for consumers, and in particular smart phone users. Smart phone applications typically will autonomously run background applications in accordance with a variety of requirements, such as updating software to the latest version. Unlike voice calls, such background applications do not typically require the input or approval of the user to run these background applications. Furthermore, the timing of activation of these applications is generally not critical, and could be equally done when the user returns to the home cellular coverage area of the user.

BRIEF SUMMARY

What is needed is an approach for a wireless communications device that supports packet-based protocols to provide the user with the ability to control the charging costs accrued when in a roaming network.

An embodiment of the present disclosure includes the step of registering a user equipment (UE) in a wireless network, where the roaming wireless network is a packet-based network and the UE has a roaming status in the wireless network. Next, an IP interface is created in the UE to thereby communicate via the wireless network to a packet data network and receive an IP address. Finally, the IP interface is placed in an inactive state, where the inactive state precludes background applications in the UE from communicating with the packet data network.

A further embodiment includes one or more circuits that are configured to register a user equipment (UE) in a wireless network, where the roaming wireless network is a packet-based network and the UE has a roaming status in the wireless network. The circuits are also configure to create an IP interface in the UE to thereby communicate via the wireless network to a packet data network and receive an IP address. Finally, the circuits are configured to set the IP interface in an inactive state, where the inactive state precludes background applications in the UE from communicating with the packet data network.

Further embodiments, features, and advantages of the disclosed embodiments, as well as the structure and operation of the various embodiments are described in detail below with reference to the accompanying drawings.

BRIEF DESCRIPTION OF THE DRAWINGS/FIGURES

The accompanying drawings, which are incorporated herein and form part of the specification, illustrate the disclosed embodiments and, together with the description, further serve to explain the principles of the disclosed embodiments and to enable a person skilled in the relevant art(s) to make and use the disclosed embodiments.

Figure 3:
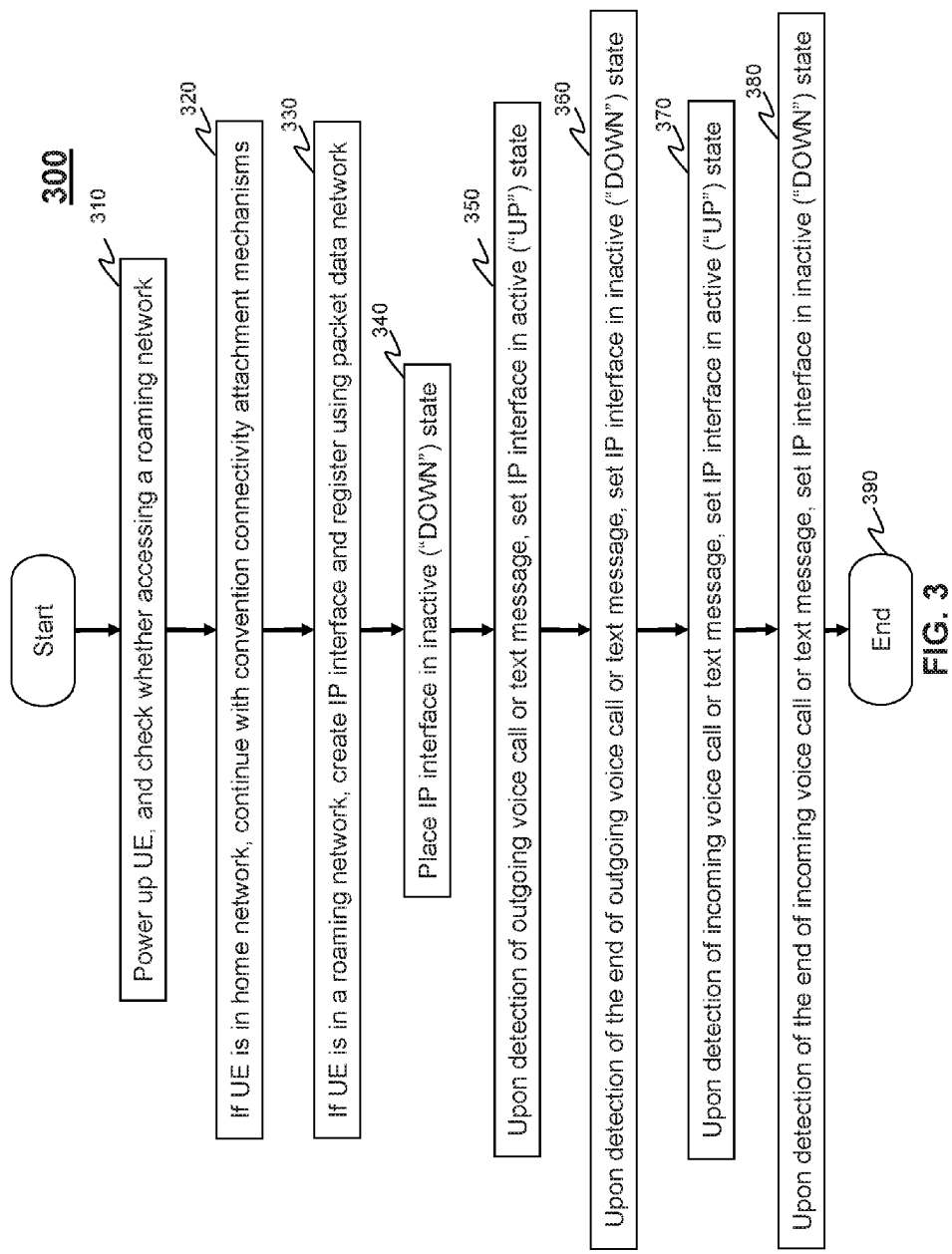

FIG. 3 provides a flowchart depicting a method for controlling online charging when accessing a roaming network, in accordance with an embodiment.

Figure 4:
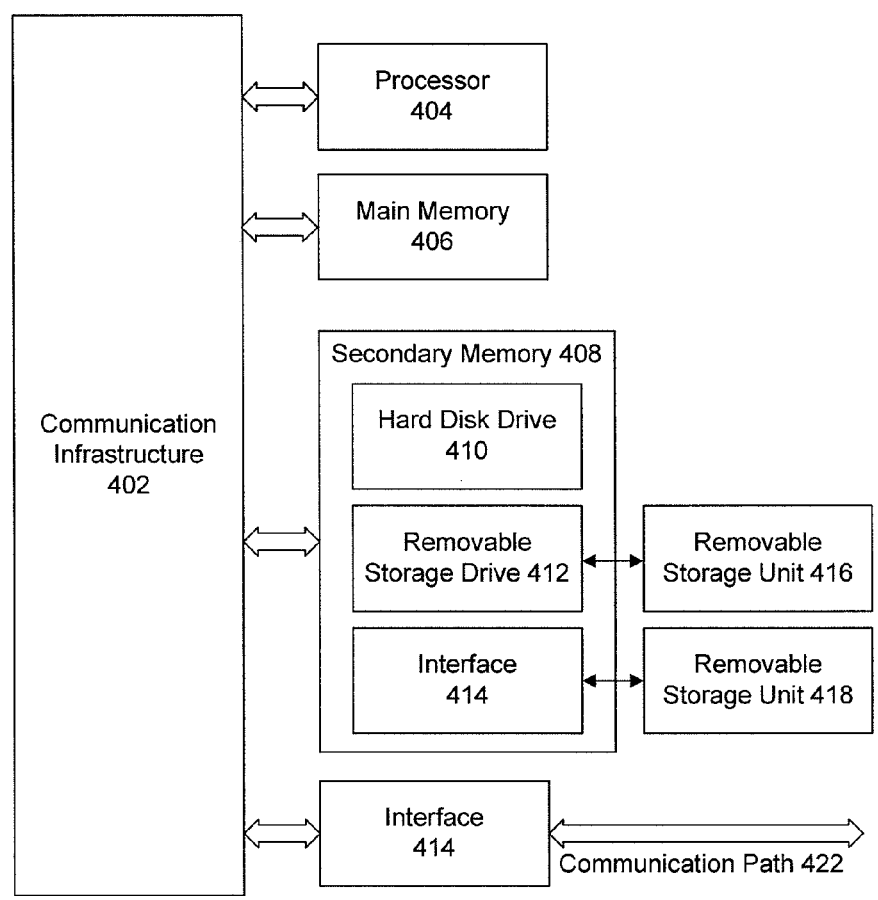

FIG. 4 illustrates a block diagram of an exemplary general purpose computer system, in accordance with some embodiments.

The features and advantages of the disclosed embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

Home Networks and Roaming Networks

Figure 1:
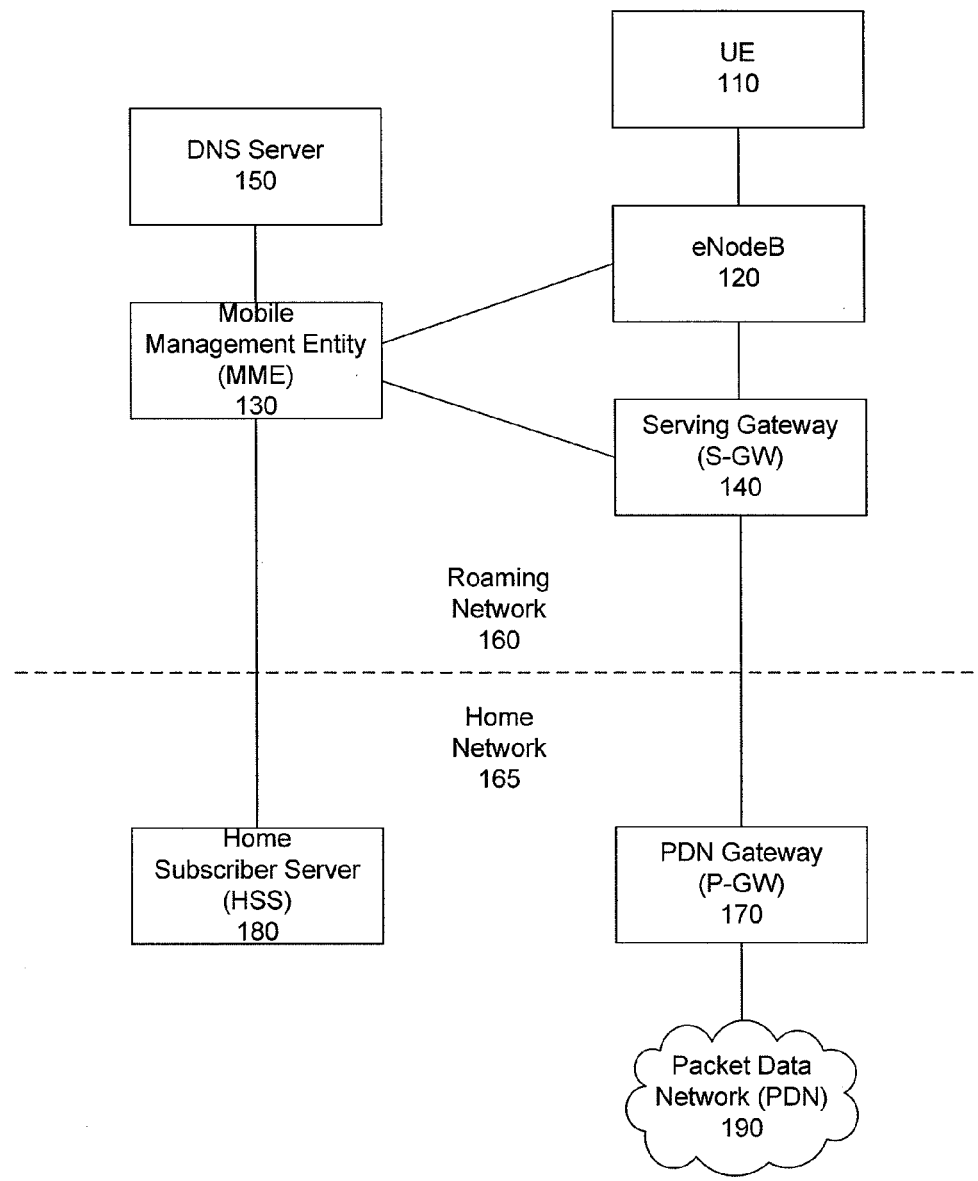
FIG. 1 illustrates a home network and a roaming network, in accordance with an embodiment.

FIG. 1 shows an example deployment of a roaming public land mobile network (RPLMN) 160 and a home PLMN (HPLMN) 165. A PLMN may comprise one or more "all-packet" wireless communication networks, such as an LTE network. RPLMN 160 and HPLMN 165 may be deployed by different network operators, who may have a roaming agreement between them.

RPLMN 160 may include an eNodeB 120, a mobile management entity (MME) 130, and a serving gateway (S-GW) 140. An eNodeB 120 supports radio communication for one or more user equipment (UE) 110. UE 110 includes such devices as mobile phones, laptops, and the like. An eNodeB 120 may be a fixed station that communicates with UE 110, and may also be referred to as a base station or an access point. An eNodeB 120 provides various functions such as radio resource management functions, IP header compression, encryption of user data streams, selection of an MME, routing of user plane data to a serving gateway, as well as scheduling and transmission of paging messages. MME 130 provides various functions such as control of signaling and security for the non-access-stratum (NAS) protocol, authentication and mobility management of UEs 110, selection of gateways for UEs 110, and bearer management functions. The non-access-stratum (NAS) protocol is used to manage the establishment of communication sessions and for maintaining continuous communications with the user equipment as it moves. Serving gateway (S-GW) 140 provides connectivity for eNodeB 120 and performs various functions such as support for handover between eNodeBs 120, buffering, routing and forwarding of data for UEs, initiation of network-triggered service request procedure, and accounting functions for charging. An eNodeB 120 communicates with MME 130 via an S1-MME interface and with serving gateway 140 via an S1-U interface. The S1-MME interface provides a reliable and guaranteed data delivery by using Stream Control Transmission Protocol (SCTP) over IP. The S1-MME interface is responsible for procedures like bearer setup and release, handover signaling, paging procedure and transport procedures. The S1-U interface takes care of delivering user data between the eNodeB 120 and S-GW 140. MME 130 communicates with serving gateway 140 via an S11 interface. A DNS server 150 may store a database of PDN gateways 170 and home agents, their Internet Protocol (IP) addresses, and their supported APNs and roaming protocols. DNS server 150 may be part of RPLMN 100a or may be external to the RPLMN.

HPLMN 165 may include a PDN gateway (P-GW) 170 and a Home Subscriber Server (HSS) 180. PDN gateway 170 interfaces with a packet data network 190, which may be the Internet, a packet data network of a home network operator, or a public or private packet data network external to the home network operator. SGi is a reference point between a PDN gateway 170 and a packet data network 190 for provision of data services. Thus, PDN gateway 170 communicates with the outside world (i.e., packet data network 190) using the SGi interface. PDN gateway 170 may perform functions such as packet filtering and IP address allocation for UEs 110, service level gating control and rate enforcement, dynamic host configuration protocol (DHCP) functions for client and server, and gateway support node functionality. HSS 180 may store subscription-related information (such as user profiles) and location information for UEs 110 that have service subscriptions in HPLMN 165. HSS 180 may perform authentication and authorization of UEs and may provide information for UEs to requesting network entities. HSS 180 may communicate with MME 130 via an S6a interface to enable, for example, the transfer of subscription and authentication data. PDN gateway 170 may communicate with serving gateway 140 via S5/S8 interfaces. In principle S5 and S8 are the same interface, with the S8 interface being used when roaming, while the S5 interface is used in the home network.

Wireless Communications Device Attachment

Prior to UE 110 receiving communication services, UE 110 attaches to the network as follows. To get non-access-stratum (NAS) level services, such as IP connectivity for IMS services, the UE needs to be recognized with the network. To facilitate this, UE 110 has to initiate an attach procedure, which is mandatory for UE 110 at power-on in an available access of the network, as discussed below.

Before initial attachment, UE 110 initiates a radio connection setup. UE 110 initiates the attach procedure by sending an attach request message to eNodeB 120. The message includes such information as the voice capabilities and preferences of UE 110. In turn, eNodeB 120 forwards the attach request message to MME 130 in a S1-MME control message. MME 130 initiates the authentication procedure for UE 110 and relies on HSS 180 to obtain the necessary authentication information applicable to UE 110. MME 130 also validates the voice capabilities and quality of service (QoS) parameters of UE 110 based on subscription data and possible operator configurations from HSS 180. MME 130 selects a serving gateway 140 and PDN gateway 170 based on such factors as location of UE 110. MME 130 responds to UE 110 with an attach accept message via eNodeB 120.

Next, eNodeB 120 performs a radio resource control (RRC) reconfiguration.

Here, UE 110 receives bearer information, bearer QoS, IP address and other information needed to support SIP signaling, and thereby completing the RRC reconfiguration. Also, eNodeB 120 sends an initial context response message to MME 130. UE 110 sends a direct transfer message to eNodeB 120, which includes the attach complete message. Next, eNodeB 120 forwards the attach complete message to MME 130. UE 110 can now send packets to eNodeB 120, which in turn will be forwarded to serving gateway 140 and PDN gateway 170. Bearers are now established for bidirectional packet transfer between UE 110 and PDN 190.

Voice Over LTE (VoLTE)

The Voice over LTE (VoLTE) protocol allows voice services to be provided over an LTE network. LTE is a packet-based wireless protocol that does not directly support circuit-switched services such as voice calls and short message service (SMS) messages. To remedy this deficiency, LTE relies on the IP Multimedia Subsystem (IMS) for delivery of services such as voice calls and SMS messages. VoLTE is based on Voice over IP (VoIP) mechanisms, and uses a Session Initiation Protocol (SIP). This PDN is established when the UE is powered on to perform IMS registration and then is used by the network to trigger incoming VoLTE call or SMS messages over IMS. It is also used by the user to perform signaling for outgoing VoLTE call, or SMS dialing. This PDN should be used in a home network and roaming networks, otherwise users cannot make or receive a voice call or SMS message over LTE.

In VoLTE, paging protocols are not used since the LTE network is an "all-packet" network. VoLTE call signaling is instead provided by Session Initiation Protocol (SIP) based signaling. Session Initiation Protocol (SIP) is a signaling communications protocol that is commonly used for controlling communication sessions, such as voice and video calls, over Internet Protocol (IP) based networks. A primary feature of SIP is its ability to provide a signaling and call-setup protocol for IP-based communications that includes call processing features present in the public switched telephone network (PSTN). Such features include the familiar telephone-like operations of dialing a number, causing a telephone to ring, hearing ring-back tones or a busy signal. While SIP does not define these features, it does provide the call-setup and signaling functions necessary to ensure that multimedia sessions, e.g., voice and video calls can routinely be conducted over an IP network. Various versions of the SIP protocol have been standardized. For example, the Internet Engineering Task Force has standardized one version of the SIP protocol in RFC 3261.

SIP is a peer-to-peer protocol, with much of the necessary intelligence located in network endpoints, e.g., terminating devices. SIP is text-based and uses various mechanisms to reliably deliver messages between network participants. SIP messages may be broadly categorized into two categories, namely requests and responses to those requests. Requests are often characterized by the nature of the request, i.e., its "method." One common SIP message is an INVITE, which is sent by a caller to request that another endpoint join a SIP session. For example, a caller would send this message to establish a media session, such as a conference or a voice call, between two participants.

As noted above, SIP uses various mechanisms to reliably deliver messages between network participants. In one such SIP mechanism, network participants maintain internal states and rely on the use of timers to determine whether the delivery of messages has been successful (or otherwise). The maintenance of these internal states and the use of timers enable SIP to reliably deliver messages despite having to rely on the use of unreliable transport mechanisms.

VoLTE relies on the use of SIP to accomplish voice calls and text messages over an LTE network. In a VoLTE system, an incoming call destined for a wireless communications device is signaled by SIP INVITE signaling. SIP signaling is sent over a default bearer of the packet data network (PDN), and the PDN may be an IP multimedia subsystem (IMS) PDN or a general purpose PDN. The INVITE messaging consists of a three-way handshake. First, the initiator of the call to the wireless communications device sends out an INVITE request, followed by a response from the wireless communications device when it has successfully received the INVITE request. Finally, the initiator then sends an ACK message, which confirms a reliable message exchange with the wireless communications device. If the wireless communications device does not provide a response, the initiator will re-transmit the INVITE message after a period of time. Thus, in the case of unreliable transport protocols, such as those used in wireless communications, the SIP INVITE request may be retransmitted in accordance with various SIP timing requirements.

However, while VoLTE provides a mechanism for voice calls and SMS messages over an all-packet network such as LTE, a downside of an "all-packet" network is as follows. When connectivity to PDN 190 is established in the modem, the OS in the application processor creates a corresponding IP interface in the application processor. This IP interface is used by the application to send and receive data over the bearer that has been established. At the same time, new applications running in application processor in modern wireless devices (such as a smartphone) may generate four to six background network requests per hour, compared to social networking applications which generate one to four per hour, and location based applications which generate two to three per hour. This data is routed through to the modem via any IP interface in an active state. The cost of this data transfer when roaming may be very high and is unknown to the user.

Roaming Control Approach

Figure 2:
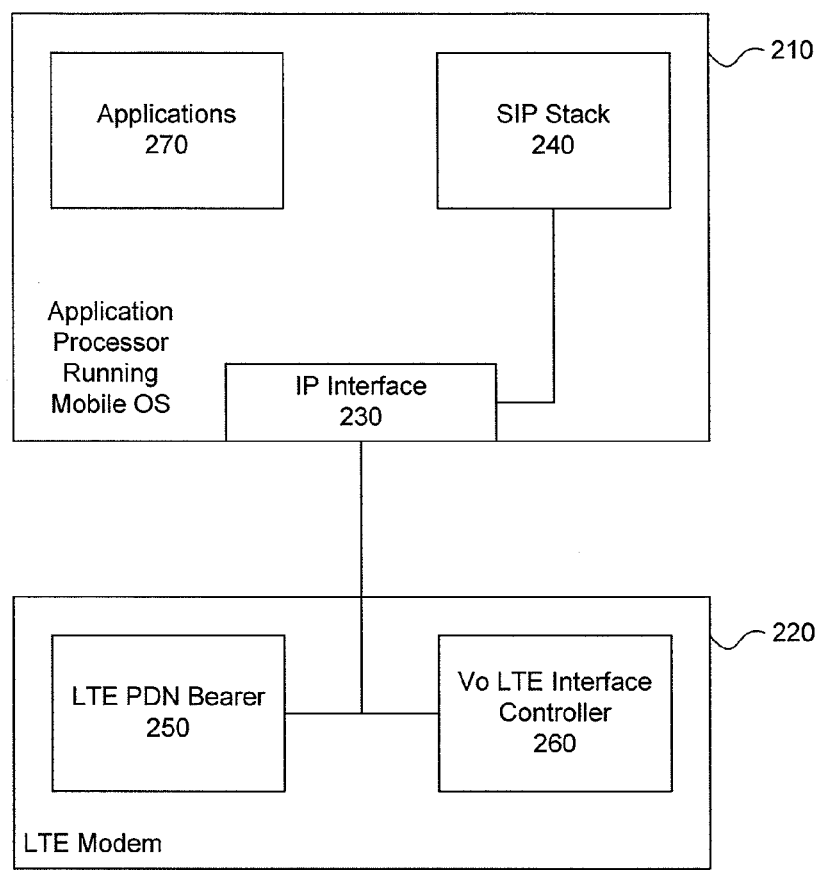
FIG. 2 illustrates an exemplary apparatus for controlling online charging when accessing a roaming network, in accordance with an embodiment.

Embodiments of the present disclosure are related to the field of LTE/EPC communication device and, in particular, control and reducing the online charging for Voice over LTE (VoLTE) users roaming in a roaming network. A benefit is to allow a user to receive and make a VoLTE call, but preclude the kind of traffic that can have a high impact in user's charging/cost when in a roaming network. FIG. 2 illustrates an exemplary apparatus for controlling online charging when accessing a roaming network, in accordance with an embodiment of the present disclosure. FIG. 2 illustrates an application processor 210 and an LTE modem 220. Application processor 210 runs a mobile operating system (OS), and provides an IP interface 230 and an associated SIP stack 240. Application processor 210 enables applications 270 to run. IP interface 230 provides connectivity to LTE modem 220. LTE modem 220 includes functional support for LTE PDN bearer 250 and VoLTE interface controller 260.

Embodiments of the present disclosure allow a UE 110 to establish connectivity to a PDN 190 in a roaming network 160 and use it for IMS signaling. UE 110 may also perform outgoing voice calls (e.g., using VoLTE) and SMS messaging, as well as receive incoming voice calls and SMS messages. In order to limit charging costs in a roaming scenario, background applications 270 are prevented from using PDN 190 for background activities. For example, operating system (OS) background applications that use an IMS PDN bearer (e.g., LTE PDN bearer 250) for firmware updates, as well as social networking and other periodic and aperiodic data traffic, are prevented in this approach. Such prevention thereby avoids the high cost of unsolicited and background data traffic over the wireless network to PDN 190. This prevention mechanism may function without impact or any visible indication to users of UE 110.

The mechanisms of this approach are as follows. Referring to FIG. 2, when UE 110 is powered on, the LTE modem 220 checks whether UE 110 is accessing a roaming PLMN 160 or accessing its home PLMN 165. If UE 110 is in its home PLMN 165, UE 110 continues with the conventional mechanisms of PDN connectivity establishment.

If UE 110 is accessing a roaming PLMN 160, the LTE modem 220 in UE 110 establishes IMS protocol connectivity to PDN 190 using the standard NAS procedures described above. When the radio interface layer is successfully created, an IP interface 230 is created in the IP stack of the application processor 210. The IP interface 230 is communicated to PDN 190 and is configured with the correct IP addressing information. Next, the IMS/SIP stack 240 performs its registration using this PDN 190.

At the end of registration process, the IP interface 230 is put in an inactive ("DOWN") state. When IP interface 230 is in an inactive ("DOWN") state, IP interface 230 is closed to data traffic emanating from the application processor 210. Such a closure ensures that no application can use IP interface 230 for background traffic, and therefore there will be no charging impact from background traffic that attempts to pass to and from UE 110. Note that when IP interface 230 is in an inactive ("DOWN") state, connectivity to PDN 190 will be maintained (i.e., connectivity will remain open) from the LTE modem 220, and therefore UE 110 continues to maintain its presence in roaming PLMN 160. LTE modem 220 continues to exchange messages with the external LTE architecture in order to keep the associated physical links open. Such a presence includes maintaining connectivity with PDN 190, maintaining an active IP address, and is such that over-the-air signaling is not required when IP interface 230 is placed in an active state. Importantly, when IP interface 230 is in an inactive ("DOWN") state, no background data can be sent to/from UE 110 to PDN 190. The placement of IP interface 230 in an inactive ("DOWN") state may be automatic upon completion of the registration process. Alternatively, a check may be made for an indication of an incoming/outgoing voice call or SMS message prior to IP interface 230 being placed in an inactive ("DOWN") state.

As noted above, the initiation of an outgoing voice call or outgoing SMS message in the UE 110 results in a process that generate a VoLTE-based voice call or a VoLTE-based SMS message. Upon detection of such a voice call or SMS message, IMS/SIP stack 240 re-activates IP interface 230 into an active ("UP") state again. In addition, IP interface 230 confirms its link to PDN 190. The confirmation of the link to PDN 190 will be accomplished rapidly since no over-the-air signaling is required, as the modem connectivity has remained open with PDN 190 while IP interface 230 has been in its inactive ("DOWN") state. As noted above, LTE modem 220 has continued to exchange messages with the external LTE architecture in order to keep the associated physical links open. The requested voice and text messaging traffic, and associated SIP signaling, will be sent to PDN 190 for duration of the voice and messaging. At the end of the VoLTE-based voice call or a VoLTE-based SMS message, IP interface 230 is put into an inactive ("DOWN") state again. As before, connectivity to PDN 190 will be maintained while in the inactive ("DOWN") state, and therefore the presence of UE 110 in the LTE network will be maintained.

A similar process occurs when an incoming voice call or incoming text message is detected by UE 110. In particular, the VoLTE interface controller 260 in the LTE modem 220 intercepts any downlink VoLTE signaling from PDN 190. If the downlink VoLTE signaling reveals an SIP INVITE signaling, an incoming voice call or incoming text message is indicated. In response, the LTE modem 220 puts IP interface 230 in the active ("UP") state on the application processor side of the LTE modem 220. Next, the SIP/IMS stack 240 processes the incoming call signaling, and UE 110 thereby receives the incoming VoLTE call. At the end of the voice call or text message, IP interface 230 is put in an inactive ("DOWN") state, and therefore no background data can be sent to/from UE 110 to PDN 190. In an embodiment, register values or equivalent may be used to indicate whether UE 110 is accessing a roaming PLMN 160 or a home PLMN 165, and whether an incoming or outgoing voice call or SMS message is being initiated.

During the time interval when a VoLTE-based voice call or a VoLTE-based SMS message is active, background data can be transferred to/from UE 110 to PDN 190. However, such data transfer is significantly less that the background data that may be transferred without the mechanisms described in various embodiments of the present disclosure.

In an embodiment of the present disclosure, the background data prevention mechanisms may be overridden by user input. Thus, the background data prevention mechanisms may be the default scenario, but may be overridden by an indication (e.g., register value setting) that indicates the user of UE 110 does not wish to allow such a mechanism to be activated in roaming PLMN 160. Such a setting may be dependent upon different types of roaming PLMN 160 and their characteristics, such as the nature of their roaming charges.

FIG. 3 provides a flowchart of a method 300 that provides for control over online charging of a wireless communications device in a roaming network (e.g., UE 110 in a roaming LTE network), according to an embodiment. It is to be appreciated the operations shown may be performed in a different order, and in some instance not all operations may be required. It is to be further appreciated that this method may be performed by one or more logic chips that read and execute these access instructions.

The process begins at step 310. In step 310, the wireless communications device (e.g., UE 110) is powered up, and the device modem (e.g., LTE modem 220) checks whether the device is accessing a roaming network or its home network.

In step 320, if the wireless communications device (e.g., UE 110) is in its home network (e.g., PLMN 165), the UE continues with the conventional mechanisms of establishment of PDN connectivity.

In step 330, if the wireless communications device (e.g., UE 110) is in a roaming PLMN (e.g., PLMN 160), the modem (e.g., LTE modem 220) establishes connectivity to PDN (e.g., PDN 190) to support IMS services. When the radio interface layer is successfully created, an IP interface is created in the application processor IP stack. The IP interface is connected to the PDN and is configured with the correct IP addressing information. Next, the IMS/SIP stack 240 performs its registration using this PDN.

In step 340, at the end of registration process, the IP interface (e.g., IP interface 230) is put in an inactive ("DOWN") state. When the IP interface is in an inactive ("DOWN") state, IP interface is closed to data traffic from the application processor side. Such a closure ensures that no application can use the IP interface for background traffic, and therefore there will be no charging impact by such background traffic passing through the UE to the PDN. Note that connectivity to the PDN will be maintained open, and therefore the wireless communications device maintains a presence in the LTE network. However, because the IP interface is in an inactive ("DOWN") state, no data from background applications (e.g., applications 270) can be sent to/from the wireless communications device to the PDN.

In step 350, the initiation of an outgoing voice call or text message in the wireless communications device results in the process to generate a SIP-based (e.g., VoLTE) voice call or a text message. Upon detection of such a SIP-based voice call or text message, the IMS/SIP stack (e.g., SIP stack 240) will put the IP interface in an active ("UP") state again. In addition, the IP interface link to the existing PDN will be confirmed. The link to the existing PDN will be accomplished rapidly since no over-the-air signaling is required. The voice and text messaging traffic, and associated SIP signaling, will be sent by the wireless communications device via eNodeB to the PDN.

In step 360, at the end of the voice call or text message, the IP interface is put into the inactive ("DOWN") state again. As before, connectivity to the PDN will be maintained, and therefore the presence of UE in the LTE network will be maintained.

In step 370, an incoming voice call or incoming text message is detected by the wireless communications device (i.e., UE 110). In particular, the VoLTE interface controller (e.g., VoLTE interface controller 260) in the modem (e.g., LTE modem 220) of the wireless communications device intercepts any downlink VoLTE signaling from the PDN. If the downlink VoLTE signaling indicates SIP signaling of a voice call or text message (e.g., a SIP INVITE message), an incoming voice call or incoming text message is indicated. In response, the modem (e.g., LTE modem 220) in the wireless communications device puts the IP interface in the active ("UP") state on the application processor side of the modem. Next, the SIP/IMS stack will receive the incoming call signaling, and the wireless communications device, such as UE 110, will receive the incoming voice call or text message.

In step 380, at the end of the voice call or text message, the IP interface is again put in the inactive ("DOWN") state.

In step 390, method 300 ends.

The above description has provided an explanation using various interfaces. However, these use of these interfaces are for illustrative purposes only and the scope of the present disclosure is not limited to these interfaces. Further, although the description has used the LTE-based environment as an exemplary embodiment, the disclosure is not limited to this protocol. As one of ordinary skill would appreciate, the approaches described above are relevant to any packet-based network communications environment.

Exemplary Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 400 is shown in FIG. 4. One or more of the modules depicted in the previous figures can be at least partially implemented on one or more distinct computer systems 400.

Computer system 400 includes one or more processors, such as processor 404. Processor 404 can be a special purpose or a general purpose digital signal processor. Processor 404 is connected to a communication infrastructure 402 (for example, a bus or network). Various software implementations are described in terms of this exemplary computer system. After reading this description, it will become apparent to a person skilled in the relevant art(s) how to implement the disclosure using other computer systems and/or computer architectures.

Computer system 400 also includes a main memory 406, preferably random access memory (RAM), and may also include a secondary memory 408. Secondary memory 408 may include, for example, a hard disk drive 410 and/or a removable storage drive 412, representing a floppy disk drive, a magnetic tape drive, an optical disk drive, or the like. Removable storage drive 412 reads from and/or writes to a removable storage unit 416 in a well-known manner. Removable storage unit 416 represents a floppy disk, magnetic tape, optical disk, or the like, which is read by and written to by removable storage drive 412. As will be appreciated by persons skilled in the relevant art(s), removable storage unit 416 includes a computer usable storage medium having stored therein computer software and/or data.

In alternative implementations, secondary memory 408 may include other similar means for allowing computer programs or other instructions to be loaded into computer system 400. Such means may include, for example, a removable storage unit 418 and an interface 414. Examples of such means may include a program cartridge and cartridge interface (such as that found in video game devices), a removable memory chip (such as an EPROM, or PROM) and associated socket, a thumb drive and USB port, and other removable storage units 418 and interfaces 414 which allow software and data to be transferred from removable storage unit 418 to computer system 400.

Computer system 400 may also include a communications interface 420. Communications interface 420 allows software and data to be transferred between computer system 400 and external devices. Examples of communications interface 420 may include a modem, a network interface (such as an Ethernet card), a communications port, a PCM-CIA slot and card, etc. Software and data transferred via communications interface 420 are in the form of signals which may be electronic, electromagnetic, optical, or other signals capable of being received by communications interface 420. These signals are provided to communications interface 420 via a communications path 422. Communications path 422 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 416 and 418 or a hard disk installed in hard disk drive 410. These computer program products are means for providing software to computer system 400.

Computer programs (also called computer control logic) are stored in main memory 406 and/or secondary memory 408. Computer programs may also be received via communications interface 420. Such computer programs, when executed, enable the computer system 400 to implement the present disclosure as discussed herein. In particular, the computer programs, when executed, enable processor 404 to implement the processes of the present disclosure, such as any of the methods described herein. Accordingly, such computer programs represent controllers of the computer system 400. Where the disclosure is implemented using software, the software may be stored in a computer program product and loaded into computer system 400 using removable storage drive 412, interface 414, or communications interface 420.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

The embodiments described, and references in the specification to "some embodiments," indicate that the embodiments described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with particular embodiments, it is understood that it is within the knowledge of one skilled in the art to effect such feature, structure, or characteristic in connection with other embodiments whether or not explicitly described.

Some embodiments may be implemented in hardware, firmware, software, or any combination thereof. Some embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the inventive subject matter such that others can, by applying knowledge within the skill of the art, readily modify and/or adapt for various applications such specific embodiments, without undue experimentation, without departing from the general concept of the inventive subject matter. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method, comprising:
   registering a user equipment (UE) in a roaming wireless network, wherein the roaming wireless network is a packet-based network and the UE has a roaming status in the roaming wireless network;
   creating an internet protocol (IP) interface in the UE to communicate via the roaming wireless network to a packet data network and receive an IP address; and
   setting the IP interface in an inactive state, the inactive state precluding background applications in the UE from communicating with the packet data network while the inactive state maintains connectivity by the UE to the packet data network, wherein the background applications exclude voice and text-message applications, and wherein the IP interface maintains IP continuity via the roaming wireless network to the packet data network during the inactive state.

2. The method of claim 1, further comprising:
   receiving an indication of an outgoing voice call or short message service (SMS) message at the UE;
   setting the IP interface in an active state in response to receiving the indication of the outgoing voice call or SMS message; and
   re-setting the IP interface in the inactive state in response to a conclusion of the outgoing voice call or SMS message.

3. The method of claim 1, further comprising:
   receiving an indication of an incoming voice call or short message service (SMS) message at the UE;
   setting the IP interface in an active state in response to receiving the indication of the incoming voice call or SMS message; and
   re-setting the IP interface in the inactive state in response to a conclusion of the incoming voice call or SMS message.

4. The method of claim 1, wherein setting the IP interface in the inactive state allows subsequent setting of the IP interface into an active state without over-the-air signaling.

5. The method of claim 1, wherein setting the IP interface in the inactive state further includes setting the IP interface in the inactive state if a user input mode is set to prevent charging costs associated with the background applications.

6. The method of claim 1, wherein the roaming wireless network is a long term evolution (LTE) network.

7. The method of claim 1, wherein the roaming wireless network uses a session initiation protocol (SIP)-based protocol to establish connectivity for voice calls or short message service (SMS) messages.

8. The method of claim 1, wherein the roaming wireless network uses a voice-over-LTE (VoLTE)-based protocol to establish connectivity for voice calls or short message service (SMS) messages to the packet data network.

9. The method of claim 1, wherein registering the UE in the roaming wireless network includes setting a register to indicate the roaming status of the UE in the roaming wireless network.

10. The method of claim 1, wherein setting the IP interface in the inactive state further includes precluding data traffic emanating from an application processor that is executing the background applications from being communicated to the packet data network.

11. The method of claim 1, further comprising exchanging messages with the packet data network during the inactive state to maintain a physical link with the packet data network or maintain an active status for the IP address with the packet data network so as to maintain the IP continuity.

12. The method of claim 1, wherein setting the IP interface in the inactive state is in response to registering the UE in the roaming wireless, network and to creating the IP interface in the UE.

13. An apparatus, comprising:
    one or more circuits configured to:
      register a user equipment (UE) in a roaming wireless network, wherein the roaming wireless network is a packet-based network and the UE has a roaming status in the roaming wireless network;
      create an internet protocol (IP) interface in the UE to thereby communicate via the roaming wireless network to a packet data network and receive an IP address; and
      set the IP interface in an inactive state, the inactive state precluding background applications in the UE from communicating with the packet data network while the inactive state maintains connectivity by the UE to the packet data network, wherein the background applications exclude voice and text-message applications, and wherein the IP interface maintains IP continuity via the roaming wireless network to the packet data network during the inactive state.

14. The apparatus of claim 13, wherein the one or more circuits are further configured to:
    receive an indication of an outgoing voice call or short message service (SMS) message at the UE;
    set the IP interface in an active state in response to receiving the indication of the outgoing voice call or SMS message; and
    re-set the IP interface in the inactive state in response to a conclusion of the outgoing voice call or SMS message.

15. The apparatus of claim 13, wherein the one or more circuits are further configured to:
- receive an indication of an incoming voice call or short message service (SMS) message at the UE;
- set the IP interface in an active state in response to receiving the indication of the incoming, voice call or SMS message; and
- re-set the IP interface in the inactive state in response to a conclusion of the incoming voice call or SMS message.

16. The apparatus of claim 13, wherein the one or more circuits are further configured to set the IP interface in the inactive state by allowing subsequent setting of the IP interface into an active state without over-the-air signaling.

17. The apparatus of claim 13, wherein the one or more circuits are further configured to set the IP interface in the inactive state by setting the IP interface in the inactive state if a user input mode is set to prevent charging costs associated with the background applications.

18. The apparatus of claim 13, wherein the roaming wireless network is a long term evolution (LTE) network.

19. The apparatus of claim 13, wherein the roaming wireless network uses a session initiation protocol (SIP)-based protocol to establish connectivity for voice calls or short message service (SMS) messages.

20. The apparatus of claim 13, wherein the roaming wireless network uses a voice over LTE (VoLTE)-based protocol to establish connectivity for voice calls or short message service (SMS) messages to the packet data network.

21. The apparatus of claim 13, wherein the one or more circuits are further configured to register the UE in the roaming wireless network by setting a register to indicate the roaming status of the UE in the roaming wireless network.

22. The apparatus of claim 13, wherein the one or more circuits are further configured to preclude data traffic emanating from an application processor that is executing the background applications from being communicated to the packet data network.

23. The apparatus of claim 13, wherein the one or more circuits are further configured to exchange messages with the packet data network during the inactive state to maintain a physical link with the packet data network or maintain an active status for the IP address with the packet data network so as to maintain the IP continuity.

24. The apparatus of claim 13, wherein the one or more circuits are further configured to set the IP interface in the inactive state in response to registering the UE in, the roaming wireless network and to creating the IP interface in the UE.

\* \* \* \* \*

UNITED STATES PATENT AND TRADEMARK OFFICE
CERTIFICATE OF CORRECTION

| | | |
|---|---|---|
| PATENT NO. | : 9,515,982 B2 | Page 1 of 1 |
| APPLICATION NO. | : 13/914497 | |
| DATED | : December 6, 2016 | |
| INVENTOR(S) | : Farouk Belghoul | |

It is certified that error appears in the above-identified patent and that said Letters Patent is hereby corrected as shown below:

In the Claims

In Column 12, Line 37, replace "wireless, network" with --wireless network--.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*